(12) United States Patent
Taborek (10) Patent No.: US 8,881,756 B1
(45) Date of Patent: *Nov. 11, 2014

(54) SYSTEM FOR HARVESTING RAINWATER

(71) Applicant: The Green Rain Barrel Incorporated, Lewes, DE (US)

(72) Inventor: Joseph W. Taborek, Huntersville, NC (US)

(73) Assignee: The Green Rain Barrel Incorporated, Lewes, DE (US)

( * ) Notice: Subject to any disclaimer, the term of this patent is extended or adjusted under 35 U.S.C. 154(b) by 32 days.

This patent is subject to a terminal disclaimer.

(21) Appl. No.: 13/847,137

(22) Filed: Mar. 19, 2013

Related U.S. Application Data (63) Continuation of application No. 12/459,239, filed on Jun. 29, 2009, now Pat. No. 8,397,746, which is a continuation of application No. 12/384,785, filed on Apr. 9, 2009, now abandoned.

(60) Provisional application No. 61/076,796, filed on Jun. 30, 2008.

(51) Int. Cl.
*F17D 1/13* (2006.01)
*E04D 13/08* (2006.01)
*C02F 1/00* (2006.01)

(52) U.S. Cl.
CPC ..................................... *E04D 13/08* (2013.01)
USPC ........... 137/357; 137/584; 52/16; 210/170.03

(58) Field of Classification Search
CPC ....... E03B 3/03; E03B 3/02; E03B 2001/047; E04D 2013/082
USPC ....... 137/236.1, 357, 584, 594, 561 R; 52/16; 405/51; 210/170.03
See application file for complete search history.

(56) References Cited

U.S. PATENT DOCUMENTS

| | | | |
|---|---|---|---|
| 4,726,151 A * | 2/1988 | Vitale | 52/16 |
| 5,114,594 A | 5/1992 | Rosebrock et al. | |
| 7,025,879 B1 | 4/2006 | Ticknor | |
| 7,048,849 B2 * | 5/2006 | Wade | 210/154 |
| 7,395,633 B2 * | 7/2008 | Baeta | 52/16 |

(Continued)

FOREIGN PATENT DOCUMENTS

JP           2003155761 A      5/2003

OTHER PUBLICATIONS

Flexeel; Plastair SpringJet 50-Foot Coiled Water Hose and Wand Set; Internet Advertisment; published prior to Jun. 30, 2008; 1 page.

(Continued)

*Primary Examiner* — Atif Chaudry
(74) *Attorney, Agent, or Firm* — Schwartz Law Firm, P.C.

(57) ABSTRACT

A system for rainwater harvesting includes a rain barrel adapted for collecting and storing rainwater runoff gravity-fed from a rooftop through a downspout. A substantially rigid downspout diverter comprises an inlet section, an overflow section, and an elongated connector section interconnecting the inlet section and the overflow section. The inlet section has a first end adapted for communicating with an end of the downspout and a second end communicating with an inlet opening formed with the rain barrel. The overflow section has a first end communicating with an overflow opening formed with the rain barrel and a second end extending away from the rain barrel.

16 Claims, 7 Drawing Sheets

(56) References Cited

U.S. PATENT DOCUMENTS

| | | | |
|---|---|---|---|
| 8,397,746 B1* | 3/2013 | Taborek | 137/357 |
| 2007/0235085 A1 | 10/2007 | Nakashima et al. | |
| 2009/0114655 A1 | 5/2009 | Weatherstone et al. | |
| 2009/0229689 A1* | 9/2009 | Booth | 137/597 |

OTHER PUBLICATIONS

Taizhou Huangyan Kaitong Plastic Factory; qx81065 plastic water buckets; published prior to Jun. 30, 2008; 1 page.

Gardener's Supply; Rain Barrels; published prior to Jun. 30, 2008; 1 page.

Kentucky Whiskey Barrel Rain Barrels; http://www.kentuckybarrels.com/RainBarrels.html; Internet Advertisment; published prior to Jun. 30, 2008; 2 pages.

Rain Barrel Guide; "How to use rain barrels for water collection"; http://www.rainbarrelguide.com; Internet Advertisement; Copyright 2004; pp. 1-8.

The Charlotte Observer; "Barrels help users get out of a pickle"; www.charlotte.com; published prior to Jun. 30, 2008; 1 page.

The #1 Quality Rain Barrel—Spruce Creek Rain Saver for Water Conservation; http://www.rainbarrel.net/specs.html; Internet Advertisement; published prior to Jun. 30, 2008; 2 pgs.

Clean Air Gardening; Rain Barrels; http://www.cleanairgardening.com/rainbarrels.html; Internet Advertisment; published prior to Jun. 30, 2008; 2 pages.

Rain Barrel How-To; Rainbarrels, Rain Barrels, Rainfall Calculator: Gardener's Supply; http://www.gardeners.com; Internet Advertisement; published prior to Jun. 30, 2008 1pg.

Super Slim Lightweight Hoses; Gardener's Supply; http://www.gardeners.com; Internet Advertisement; published prior to Jun. 30, 2008; 1 pg.

Plastic-Mart; Liquid Storage and Containment; http://www.plastic-mart.com/class.php?cat=187; Internet Advertisment; published prior to Jun. 30, 2008; 1 pg.

New and Used Kentucky Whiskey Barrels, Wine Barrels, etc.; http://www.kentuckybarrels.com; Kentucky Barrels, LLC; Internet Advertisment; published prior to Jun. 30, 2008; 1 pg.

RainPerfect(TM); Solar Powered Rain Barrel Pump System; Magazine Advertisement; 1-800-SkyMall or www.SkyMall.com; Published prior to Aug. 16, 2012; 1 pg.

Instructions for Installing Rain Barrel; Connecting the spigot to the barrel; Published prior to Aug. 16, 2012; 2 pgs.

Rescue Environmentally Responsible Products; Delux Rain Barrel Rainwater Collection System; Emsco Group; Published prior to Aug. 16, 2012; 1 pg.

Welcome to Noah's Rain Barrel. Maker of high quality rain barrel; "Not all rain barrels are created equal."; Internet Advertisment; http://www.noahsrainbarrel.net; 1 pg.

\* cited by examiner

SYSTEM FOR HARVESTING RAINWATER

TECHNICAL FIELD AND BACKGROUND

The present disclosure relates broadly to a system and method for harvesting rainwater. In one exemplary implementation, the disclosure comprises a do-it-yourself rainwater harvesting system for homeowners which utilizes a downspout diverter and an aesthetically desirable rain barrel.

Rainwater harvesting is the gathering, or accumulating and storing, of rainwater. Traditionally, rainwater harvesting has been practiced in areas where water exists in plenty, and has provided drinking water, domestic water, water for livestock, water for irrigation and a way to increase ground water levels.

SUMMARY OF EXEMPLARY EMBODIMENTS

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

According to one exemplary embodiment, the present disclosure comprises a system for rainwater harvesting. The exemplary system includes a rain barrel adapted for collecting and storing rainwater runoff gravity-fed from a rooftop through a downspout. A substantially rigid downspout diverter comprises an inlet section, an overflow section, and an elongated connector section interconnecting the inlet section and the overflow section. The inlet section has a first end adapted for communicating with an end of the downspout and a second end communicating with an inlet opening formed with the rain barrel. The overflow section has a first end communicating with an overflow opening formed with the rain barrel and a second end extending away from the rain barrel.

The term "downspout" refers broadly herein to any pipe or other suitable conduit for conveying rain water from a roof or gutter towards the ground or a drain.

The term "rain barrel" means any above ground or below ground vessel capable of collecting and storing rainwater.

According to another exemplary embodiment, the rain barrel has at least one generally planar side wall. The side wall may be substantially flat and may extend from the top of the rain barrel to the bottom of the rain barrel, such that the system may be located directly and closely adjacent a side of a building.

According to another exemplary embodiment, the rain barrel comprises a removable top and a bottom.

According to another exemplary embodiment, the rain barrel defines first and second mirrored inlet openings formed with the removable top. The inlet openings are "mirrored" in that they are formed in corresponding locations on opposite sides of the rain barrel.

According to another exemplary embodiment, a mesh screen plug is inserted into an unused one of the first and second inlet openings. The exemplary mesh screen defines small openings sufficient to allow air circulation within the rain barrel, while preventing entry of flies, mosquitos, gnats, ants, and other small bugs and insects into the rain barrel.

According to another exemplary embodiment, the rain barrel defines first and second mirrored overflow openings formed with the bottom. The overflow openings are "mirrored" in that they are formed in corresponding locations on opposite sides of the rain barrel.

According to another exemplary embodiment, a solid wall plug is inserted into an unused one of the first and second overflow openings.

According to another exemplary embodiment, a spigot is connected to the rain barrel, and is adapted for enabling controlled dispensing of water contained in the rain barrel.

According to another exemplary embodiment, the rain barrel defines a drain opening therein.

According to another exemplary embodiment, a solid wall plug is provided for removably sealing the drain opening formed with the rain barrel.

According to another exemplary embodiment, the inlet, overflow, and connector sections of the downspout diverter are integrally formed together as a single homogenous structure. The language "single homogenous structure" means a unitary structure which is formed together without joints (i.e., without assembly or attachment of multiple separate parts).

According to another exemplary embodiment, the inlet, overflow, and connector sections of the downspout diverter are formed together in substantially the same vertical plane, such that said downspout diverter is reversible for use on either side of the rain barrel.

According to another exemplary embodiment, the inlet section of the downspout diverter is concavely arcuate from its first end to its second end.

According to another exemplary embodiment, the overflow section of the downspout diverter is convexly arcuate from its first end to its second end.

According to another exemplary embodiment, the connector section of the downspout diverter extends in a substantially straight line from the inlet section to the overflow section.

BRIEF DESCRIPTION OF THE DRAWINGS

The description of exemplary embodiments proceeds in conjunction with the following drawings, in which.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
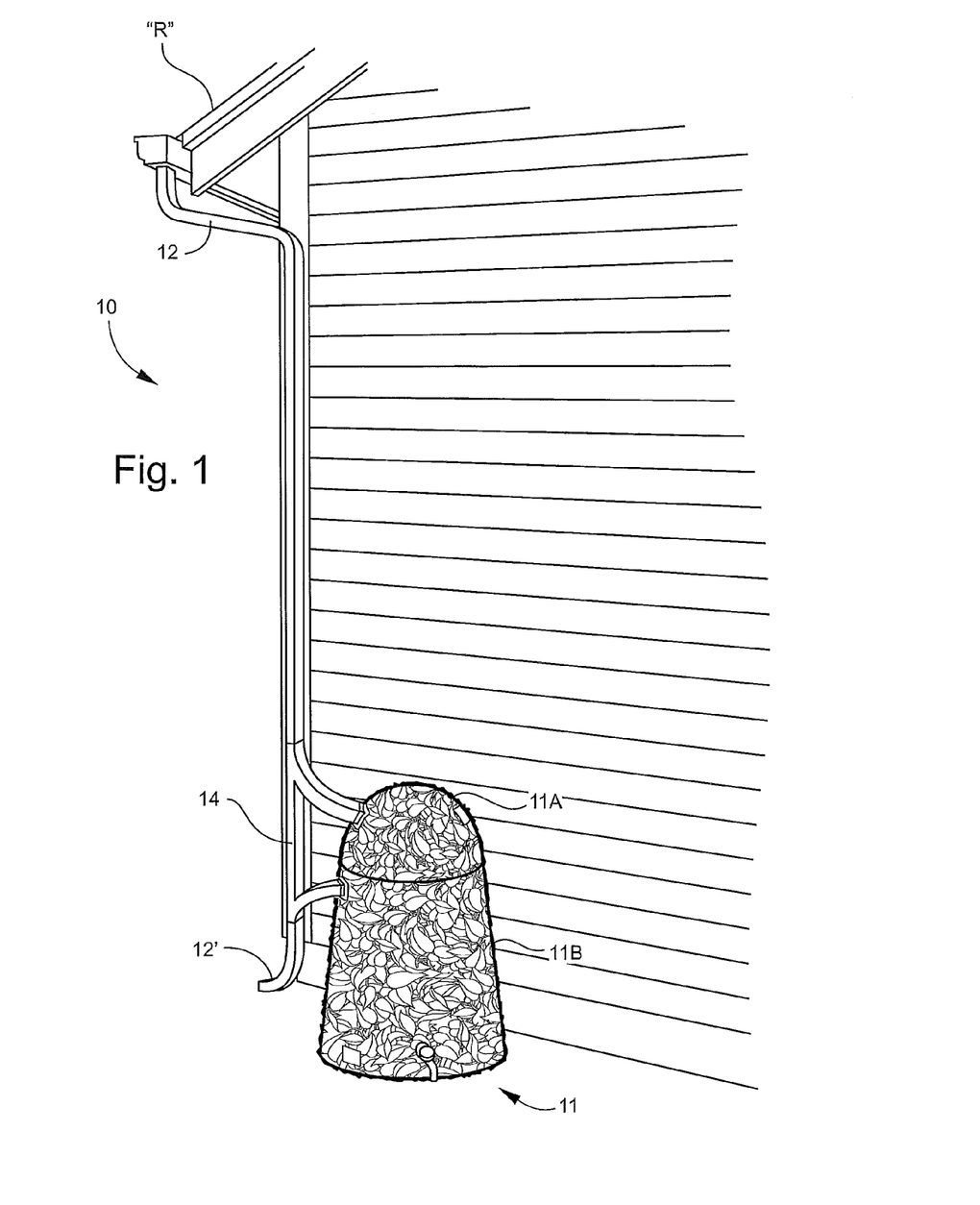
FIG. 1 is an environmental view of a rainwater harvesting system according to one exemplary embodiment of the present disclosure.
Figure 2:
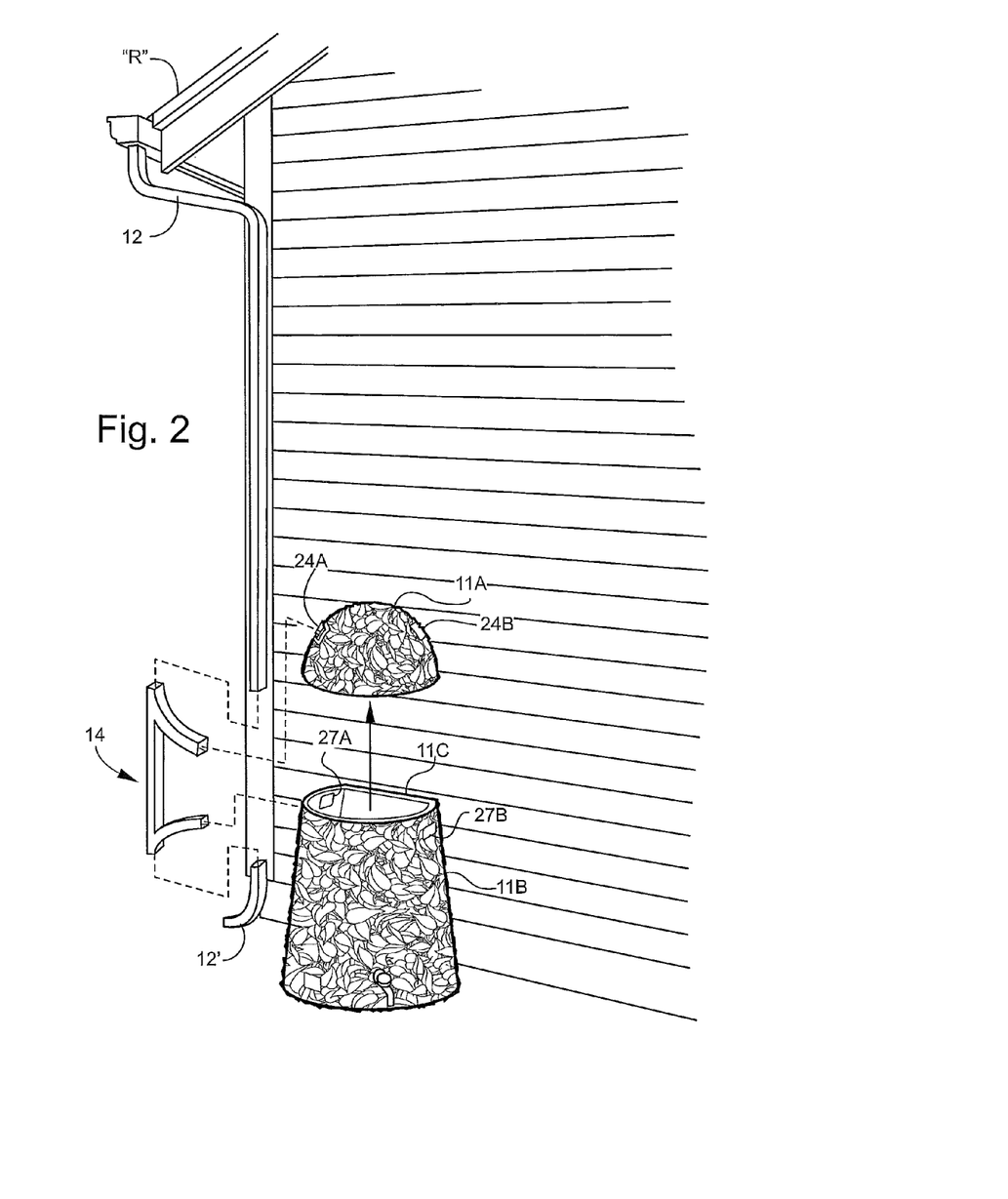
FIG. 2 is a further view of the exemplary system showing various components of the system exploded away.
Figure 3:
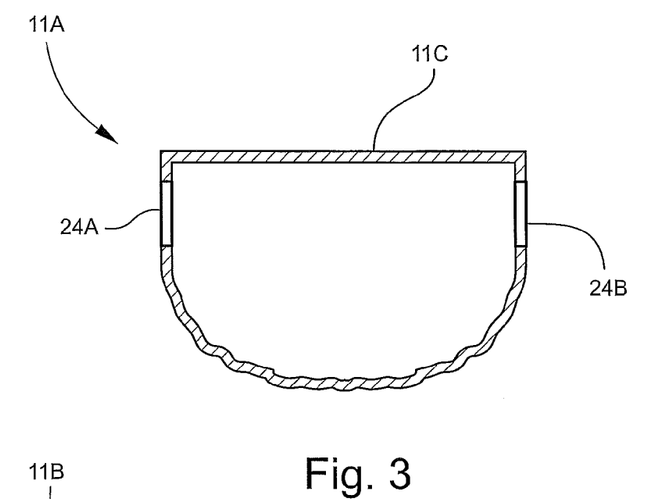
FIG. 3 is a cross-sectional view taken through the removable top of the rain barrel at the mirrored inlet openings.
Figure 4:
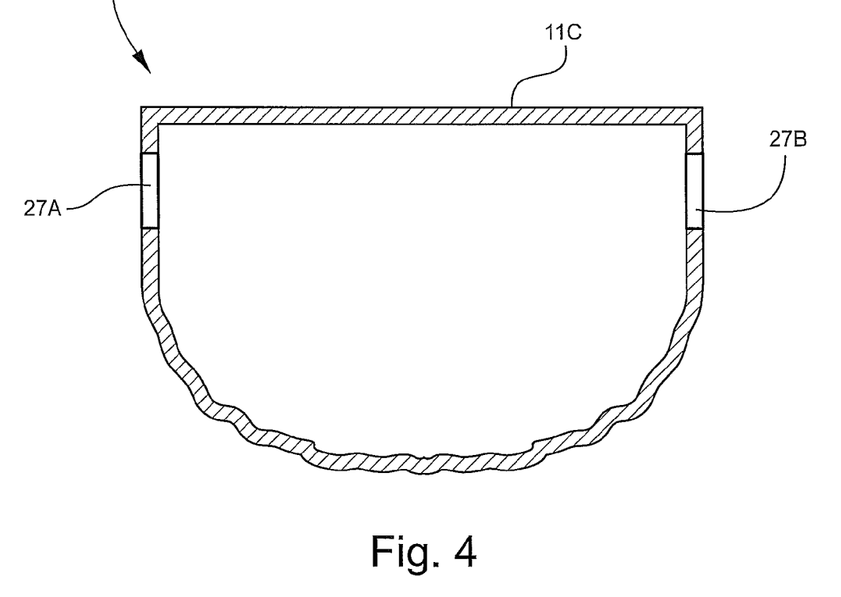
FIG. 4 is a cross-sectional view taken through the bottom of the rain barrel at the mirrored overflow openings.

Referring now specifically to the drawings, a rainwater harvesting system according to one exemplary embodiment of the present invention is illustrated in FIG. 1 and shown generally at reference numeral 10. The exemplary system utilizes a rain barrel 11 designed to collect and store rainwater runoff gravity-fed from a building rooftop "R" through an attached existing downspout 12, and a substantially rigid downspout diverter 14 fluidly interconnecting the downspout 12 and rain barrel 11. The existing downspout 12 may have a standard 3"×4" dimension, or may be smaller or larger. As best shown in FIGS. 2, 3, and 4, the rain barrel 11 has a removable tapered top 11A and bottom 11B, and a substantially planar (or flat) back side 11C enabling close placement directly adjacent a side of the building. The water capacity of the exemplary rain barrel 11 may be 55 gallons or more. The top and bottom 11A, 11B may be assembled together either with or without fasteners or other attachment means. In the exemplary embodiment shown, the rain barrel 11 is loosely held in an assembled condition by a mating tongue 16 and groove 18 (See FIGS. 5 and 8) formed with the top 11A and bottom 11B, respectively. Additionally, the rain barrel 11 may have a molded exterior formed of a UV-resistant plastic which is shaped and colored to resemble aesthetically desirable landscaping.

Figures 6, 7:
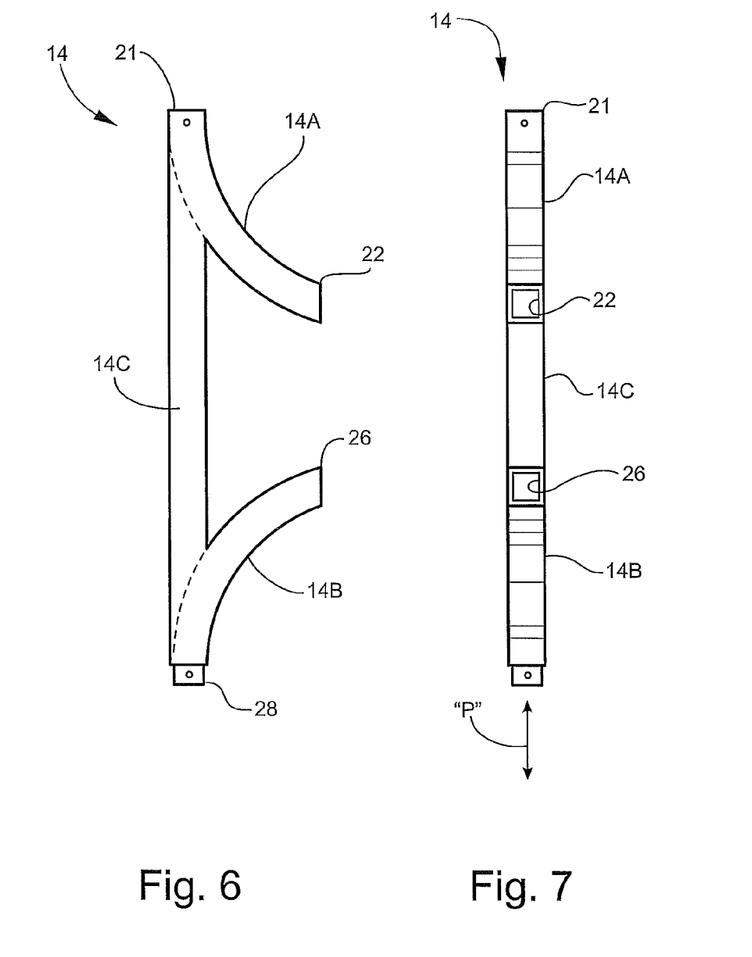
FIG. 6 is a building-side view of the downspout diverter.
FIG. 7 is a barrel-side view of the downspout diverter.
Figure 8:
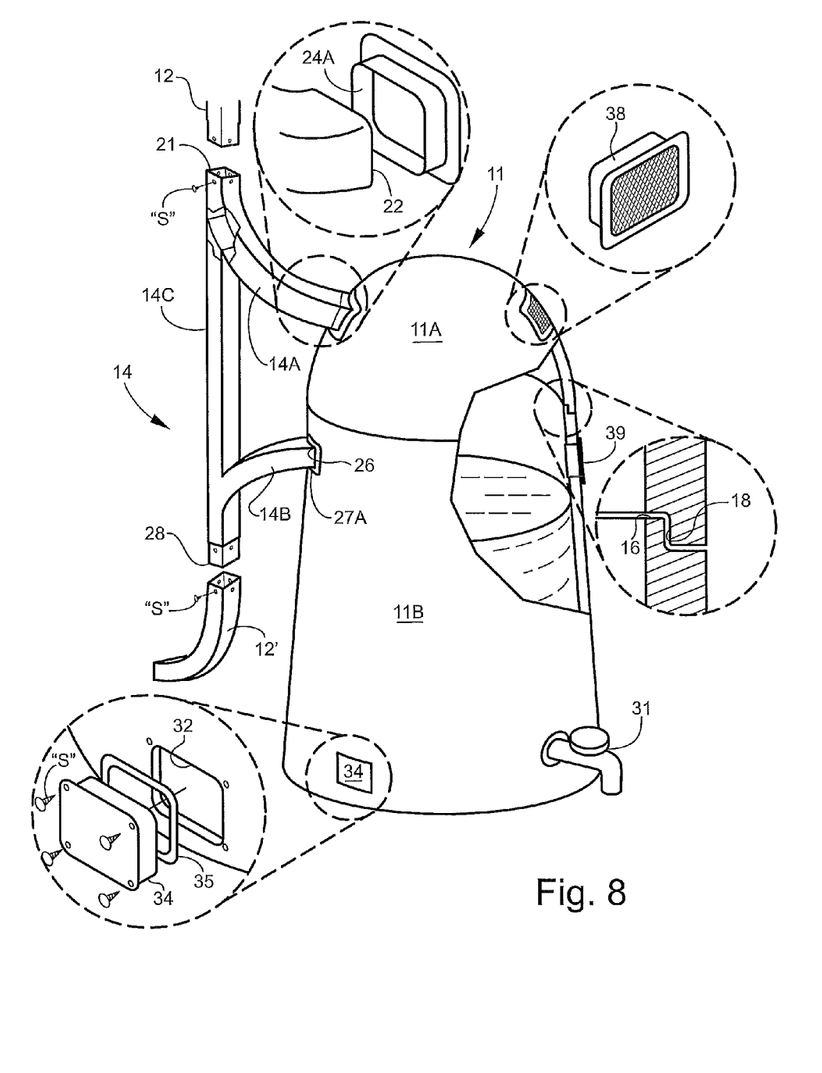
FIG. 8 is a fragmentary exploded view showing various exemplary components of the rainwater harvesting system.

As best shown in FIGS. 6, 7, and 8, the downspout diverter 14 comprises an inlet section 14A, an overflow section 14B, and an elongated connector section 14C. The diverter sections 14A-14C may be integrally formed together (e.g., molded) as a single homogenous structure, and formed in substantially the same vertical plane "P" (See FIG. 7) such that the downspout diverter 14 is reversible for use on either side of the rain barrel 11, as described further below. Referring to FIG. 8, the inlet section 14A has a first open end 21 which connects to the existing downspout 12 using small metal screws "S" or other fasteners, and a second open end 22 connecting to the rain barrel 11 through an inlet opening 24A formed with the top 11A. The inlet section 14A is concavely arcuate from its first end 21 to its second end 22. The overflow section 14B of the exemplary diverter 14 has a first open end 26 connected to the rain barrel 11 through an overflow opening 27A formed with the bottom 11B, and a second open end 28 which extends away from the rain barrel 11. The second end 28 may be connected using metal screws "S" (or other fasteners) to an additional length of downspout 12' matching the existing downspout 12. The overflow section 14B is convexly arcuate from its first open end 26 to its second open end 28. The elongated connector section 14C of the diverter 14 interconnects the inlet section 14A and the overflow section 14B, and extends in a substantially straight line along generally the same vertical axis of the existing downspout 12. The connector section 14C is closed at each end (or at least its top end), such that rainwater is entirely diverted from the downspout 12 and gravity-fed into the rain barrel 11 through the inlet section 14A.

Figure 5:
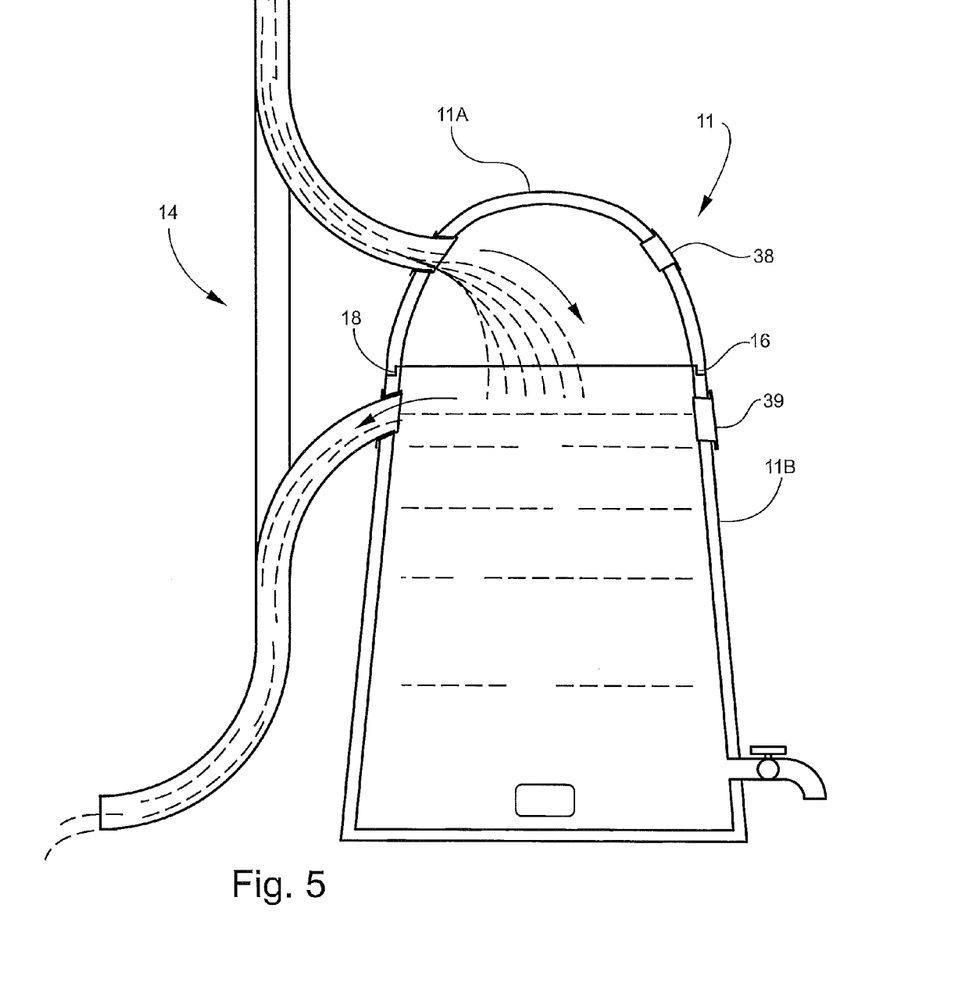
FIG. 5 is a schematic view illustration operation of the exemplary system.

Referring to FIGS. 5 and 8, rainwater may be dispensed from the rain barrel 11 in a controlled manner using a standard brass spigot 31 (or petcock) connected to the bottom 11B in a reinforced area of the rain barrel 11. The exemplary spigot 31 is located approximately 3-inches from the ground or other supporting surface. Watering hoses and wands may also be connected directly to the spigot 31. A shelf (not shown) may also be located adjacent the rain barrel 11 to support a water bucket used for transporting water from the rain barrel 11 to various landscaped areas around the building. For more immediate flushing, the rain barrel 11 may include a drain opening 32. The drain opening 32 is located approximately one-half inch from the ground (or other supporting surface), and may be removably sealed using a solid-wall plug 34, gasket 35, and screws "S", as demonstrated in FIG. 8.

Figure 9:
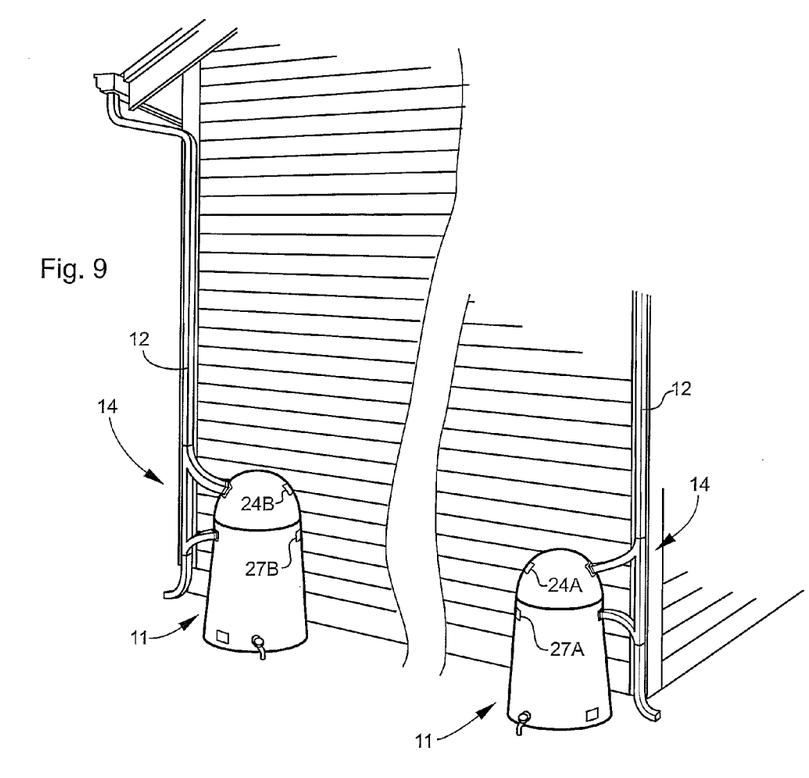
FIG. 9 is a further environmental view demonstrating use of the exemplary system on both right and left sides of existing downspouts.

As shown in FIG. 9, the exemplary system 10 is designed to be utilized on either side (i.e., to the right or left) of an existing downspout 12. In the embodiment shown, the top 11A of the rain barrel 11 has first and second mirrored inlet openings 24A, 24B (See FIG. 3)—one of which receives the second end 22 of the diverter inlet section 14A, as described above. The unused inlet opening 24B may be removably covered using a mesh screen plug 38 best shown in FIG. 8. The exemplary plug 38 defines small openings sufficient to allow air circulation within the rain barrel, while preventing entry of flies, mosquitos, gnats, ants, and other small bugs and insects. Like the top 11A, the bottom 11B of the rain barrel 11 has first and second mirrored overflow openings 27A, 27B (See FIG. 4)—one of which receives the first open end 26 of the diverter overflow section 14B, as described above. The unused overflow opening 27B may be removably covered using a solid wall plug 39 best shown in FIG. 8. The plug 39 may be attached to the rain barrel bottom 11B using small screws or other means (not shown), and may also incorporate a gasket to further seal the unused opening 27B in a manner similar to that used to close the drain opening 32.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

I claim:

1. A system for rainwater harvesting, comprising:
a rain barrel adapted for collecting and storing rainwater runoff gravity-fed from a rooftop through a downspout;
a substantially rigid downspout diverter comprising an inlet section, an overflow section, and an elongated connector section interconnecting said inlet section and said overflow section;
said inlet section having a first end adapted for communicating with an end of the downspout and a second end communicating with an inlet opening formed with said rain barrel, and said inlet section being concavely arcuate from its first end to its second end;
said overflow section having a first end communicating with an overflow opening formed with said rain barrel and a second end extending away from said rain barrel; and
wherein said inlet, overflow, and connector sections of said downspout diverter are formed together in substantially the same vertical plane such that said downspout diverter is reversible for use on either side of said rain barrel.

2. A system for rainwater harvesting according to claim 1, wherein said rain barrel comprises at least one generally planar side wall.

3. A system for rainwater harvesting according to claim 2, wherein said rain barrel comprises a removable top and a bottom.

4. A system for rainwater harvesting according to claim 3, wherein said rain barrel defines first and second mirrored inlet openings formed with said removable top.

5. A system for rainwater harvesting according to claim 4, and comprising a mesh screen plug inserted into an unused one of said first and second inlet openings.

6. A system for rainwater harvesting according to claim 1, wherein said rain barrel defines first and second mirrored overflow openings formed with said bottom.

7. A system for rainwater harvesting according to claim 6, and comprising a solid wall plug inserted into an unused one of said first and second overflow openings.

8. A system for rainwater harvesting according to claim 1, and comprising a spigot connected to said rain barrel and adapted for enabling controlled dispensing of water contained in said rain barrel.

9. A system for rainwater harvesting according to claim 1, wherein said rain barrel defines a drain opening therein.

10. A system for rainwater harvesting according to claim 9, and comprising solid wall plug adapted for removably sealing said drain opening.

11. A system for rainwater harvesting according to claim 1, wherein the overflow section of said downspout diverter is convexly arcuate from its first end to its second end.

12. A system for rainwater harvesting according to claim 1, wherein the connector section of said downspout diverter extends in a substantially straight line from the inlet section to the overflow section.

13. In combination with a rainwater downspout extending downwardly from a building rooftop, a system for rainwater harvesting comprising:
a rain barrel defining an inlet opening and an overflow opening;
a substantially rigid downspout diverter comprising an inlet section, an overflow section, and an elongated connector section interconnecting said inlet section and said overflow section;
said inlet section having a first end communicating with an end of said downspout and a second end communicating with the inlet opening formed with said rain barrel, and said inlet section being concavely arcuate from its first end to its second end;
said overflow section having a first end communicating with the overflow opening formed with said rain barrel and a second end extending away from said rain barrel; and
and wherein said inlet, overflow, and connector sections of said downspout diverter are formed together in substantially the same vertical plane such that said downspout diverter is reversible for use on either side of said rain barrel.

14. A combination according to claim 13, wherein the overflow section of said downspout diverter is convexly arcuate from its first end to its second end.

15. A combination according to claim 13, wherein the connector section of said downspout diverter extends in a substantially straight line from the inlet section to the overflow section.

16. A downspout diverter adapted for use in combination with a rainwater downspout and a rain barrel, said downspout diverter comprising:
an inlet section having a first end adapted for communicating with the downspout and a second end adapted for communicating with the rain barrel, and wherein said inlet section is concavely arcuate from its first end to its second end;
an overflow section having a first end adapted for communicating with the rain barrel and a second end adapted for extending away from the rain barrel, and wherein said overflow section is convexly arcuate from its first end to its second end;
an elongated connector section interconnecting said inlet section and said overflow section, and extending in a substantially straight line from said inlet section to said overflow section; and and wherein said inlet, overflow, and connector sections are integrally formed together in substantially the same vertical plane such that said downspout diverter is reversible for use on either side of the rain barrel.

\* \* \* \* \*